(12) United States Patent
Kako et al.

(10) Patent No.: US 11,515,537 B2
(45) Date of Patent: Nov. 29, 2022

(54) ENERGY STORAGE DEVICE AND ENERGY STORAGE APPARATUS

(71) Applicant: GS Yuasa International Ltd., Kyoto (JP)

(72) Inventors: Tomonori Kako, Kyoto (JP); Akihiko Miyazaki, Kyoto (JP); Masashi Takano, Kyoto (JP); Kenta Nakai, Kyoto (JP); Ukyo Harinaga, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 220 days.

(21) Appl. No.: 16/763,173

(22) PCT Filed: Nov. 21, 2018

(86) PCT No.: PCT/JP2018/042914
§ 371 (c)(1),
(2) Date: May 11, 2020

(87) PCT Pub. No.: WO2019/103019
PCT Pub. Date: May 31, 2019

(65) Prior Publication Data
US 2020/0388845 A1 Dec. 10, 2020

(30) Foreign Application Priority Data
Nov. 22, 2017 (JP) .............................. JP2017-224748

(51) Int. Cl.
*H01M 4/00* (2006.01)
*H01M 4/587* (2010.01)
(Continued)

(52) U.S. Cl.
CPC ........... *H01M 4/587* (2013.01); *H01M 4/133* (2013.01); *H01M 4/382* (2013.01); *H01M 4/505* (2013.01);
(Continued)

(58) Field of Classification Search
CPC .. H01M 4/382; H01M 10/0525; H01M 4/661; H01M 4/133; H01M 4/587; H01G 11/32
See application file for complete search history.

(56) References Cited

U.S. PATENT DOCUMENTS

2010/0233542 A1 9/2010 Endo et al.
2010/0323235 A1 12/2010 Takami et al.
(Continued)

FOREIGN PATENT DOCUMENTS

JP H09-283117 A 10/1997
JP 2000-348725 A 12/2000
(Continued)

OTHER PUBLICATIONS

International Search Report (ISR) (PCT Form PCT/ISA/210), in PCT/JP2018/042914, dated Feb. 19, 2019.

*Primary Examiner* — Cynthia H Kelly
*Assistant Examiner* — Monique M Wills
(74) *Attorney, Agent, or Firm* — McGinn IP Law Group, PLLC

(57) ABSTRACT

An energy storage device includes a negative electrode having a negative active material layer containing amorphous carbon as an active material, a curve attained by determining a rate of change (dQ/dV) in a potential (V) of the amorphous carbon in a discharge capacity (Q) of the amorphous carbon per unit quantity based on a result attained by measuring the potential (V) with respect to the discharge capacity (Q) and representing the rate of change (dQ/dV) with respect to the potential (V) has one or more peaks in a range in which the potential of the amorphous carbon is 0.8 V or more and 1.5 V or less, and a potential of the negative electrode at time of full charge is 0.25 V or more with respect to a lithium potential.

20 Claims, 4 Drawing Sheets

(51) Int. Cl.
  *H01M 4/133* (2010.01)
  *H01M 4/38* (2006.01)
  *H01M 4/505* (2010.01)
  *H01M 4/525* (2010.01)
  *H01M 4/02* (2006.01)

(52) U.S. Cl.
  CPC ...... *H01M 4/525* (2013.01); *H01M 2004/027* (2013.01); *H01M 2004/028* (2013.01)

(56) References Cited

U.S. PATENT DOCUMENTS

| | | | |
|---|---|---|---|
| 2011/0037440 A1 | 2/2011 | Endo et al. | |
| 2013/0314050 A1 | 11/2013 | Matsubara et al. | |
| 2014/0011091 A1* | 1/2014 | Endo | H01M 4/131 |
| | | | 429/223 |
| 2015/0311517 A1* | 10/2015 | Yamamoto | H01M 4/583 |
| | | | 429/229 |
| 2017/0077549 A1 | 3/2017 | Park et al. | |

FOREIGN PATENT DOCUMENTS

| | | |
|---|---|---|
| JP | 2001-143666 A | 5/2001 |
| JP | 2002-231225 A | 8/2002 |
| JP | 2004-296256 A | 10/2004 |
| JP | 2008-004440 A | 1/2008 |
| JP | 2011-108664 A | 6/2011 |
| JP | 2012-109175 A | 6/2012 |
| JP | 2013-152824 A | 8/2013 |
| JP | 2013-247003 A | 12/2013 |
| JP | 2014-056697 A | 3/2014 |
| JP | 5726954 B2 | 6/2015 |
| JP | 2016-091927 A | 5/2016 |
| JP | 2017-059532 A | 3/2017 |

* cited by examiner

ENERGY STORAGE DEVICE AND ENERGY STORAGE APPARATUS

TECHNICAL FIELD

The present invention relates to an energy storage device such as a lithium ion secondary battery and an energy storage apparatus including a plurality of the energy storage devices.

BACKGROUND ART

Hitherto, a lithium ion secondary battery is known, which includes an electrode wound group in which a positive electrode, a negative electrode, and a separator are wound and an electrolyte solution in a battery case.

The battery described in Patent Document 1 discloses the following technical contents. The positive electrode includes a current collector and a positive electrode mixture applied on both surfaces of the current collector, and the positive electrode mixture contains a layered lithium-nickel-manganese-cobalt composite oxide as a positive active material. The amount of the positive electrode mixture applied on one surface is 110 to 170 g/m², and the density of the positive electrode mixture is 2.5 to 2.8 g/cm³. The negative electrode includes a current collector and a negative electrode mixture applied on both surfaces of the current collector, and the negative electrode mixture contains amorphous carbon as a negative active material. The electrolyte solution contains a cyclic carbonate, a chain carbonate, a cyclic sulfonic acid ester, and vinylene carbonate as a nonaqueous solvent.

PRIOR ART DOCUMENT

Patent Document

Patent Document 1: JP-A-2016-091927

SUMMARY OF THE INVENTION

Problems to be Solved by the Invention

Energy storage devices such as the battery described in Patent Document 1 are designed to have sufficient power input and output performance so as to be specialized for applications in, for example, hybrid vehicles, but the initial capacity thereof is often not so high. In recent years, energy storage devices are more widely used in motor vehicle applications, and thus energy storage devices having a relatively high initial capacity in addition to sufficient power input and output characteristics are demanded.

Hence, it is conceivable to investigate energy storage devices to which amorphous carbon, which can increase the charge-discharge capacity as compared to conventional amorphous carbon, is applied as an active material. However, in such energy storage devices, a problem may arise that the voltage curves at the time of charge and at the time of discharge are greatly dissociated, that is, the hysteresis increases. It is difficult to control charge and discharge when the hysteresis increases.

An object of the present embodiment is to provide an energy storage device having a suppressed increase in hysteresis at the time of charge and at the time of discharge while having a relatively high initial capacity and an energy storage apparatus including a plurality of the energy storage devices.

Means for Solving the Problems

An energy storage device of the present embodiment includes a negative electrode having a negative active material layer containing amorphous carbon as an active material, a curve obtained by determining a rate of change (dQ/dV) in a potential (V) of the amorphous carbon in a discharge capacity (Q) of the amorphous carbon per unit quantity based on a result obtained by measuring the potential (V) with respect to the discharge capacity (Q) and representing the rate of change (dQ/dV) with respect to the potential (V) has one or more peaks in a range in which the potential of the amorphous carbon is 0.8 V or more and 1.5 V or less, and a potential of the negative electrode at time of full charge is 0.25 V or more with respect to a lithium potential.

An energy storage apparatus of the present embodiment includes a plurality of the energy storage devices described above, the plurality of energy storage devices are connected in series, and the energy storage devices include a positive electrode containing a lithium-transition metal composite oxide that has an α-NaFeO₂ type structure and is represented by a chemical composition of $Li_{1+x}M_{1-x}O_2$ (here, M is a transition metal and 0<x<0.3) as an active material.

Advantages of the Invention

According to the present embodiment, it is possible to provide an energy storage device having a suppressed increase in hysteresis at the time of charge and at the time of discharge while having a relatively high initial capacity. It is also possible to provide an energy storage apparatus including a plurality of the energy storage devices.

MODE FOR CARRYING OUT THE INVENTION

Hereinafter, an embodiment of an energy storage device according to the present invention will be described with reference to FIGS. 1 and 2. The energy storage device includes a secondary battery, a capacitor, and the like. In the present embodiment, a chargeable-dischargeable secondary battery will be described as an example of the energy storage device. Incidentally, the names of the respective constituent members (respective constituent elements) of the present embodiment are those in the present embodiment and may differ from the names of the respective constituent members (respective constituent elements) in the background art.

An energy storage device 1 of the present embodiment is a nonaqueous electrolyte secondary battery. In more detail, the energy storage device 1 is a lithium ion secondary battery utilizing electron movement that occurs as lithium ions move. This kind of energy storage device 1 supplies electric energy. The energy storage device 1 is used singly or in the plural. Specifically, the energy storage device 1 is used singly when the required power and the required voltage are low. On the other hand, the energy storage device 1 is used in an energy storage apparatus in combination with other energy storage devices 1 when at least either of the required power or the required voltage is high. In the energy storage apparatus, the energy storage devices 1 used in the energy storage apparatus supply electric energy.

Figure 1:
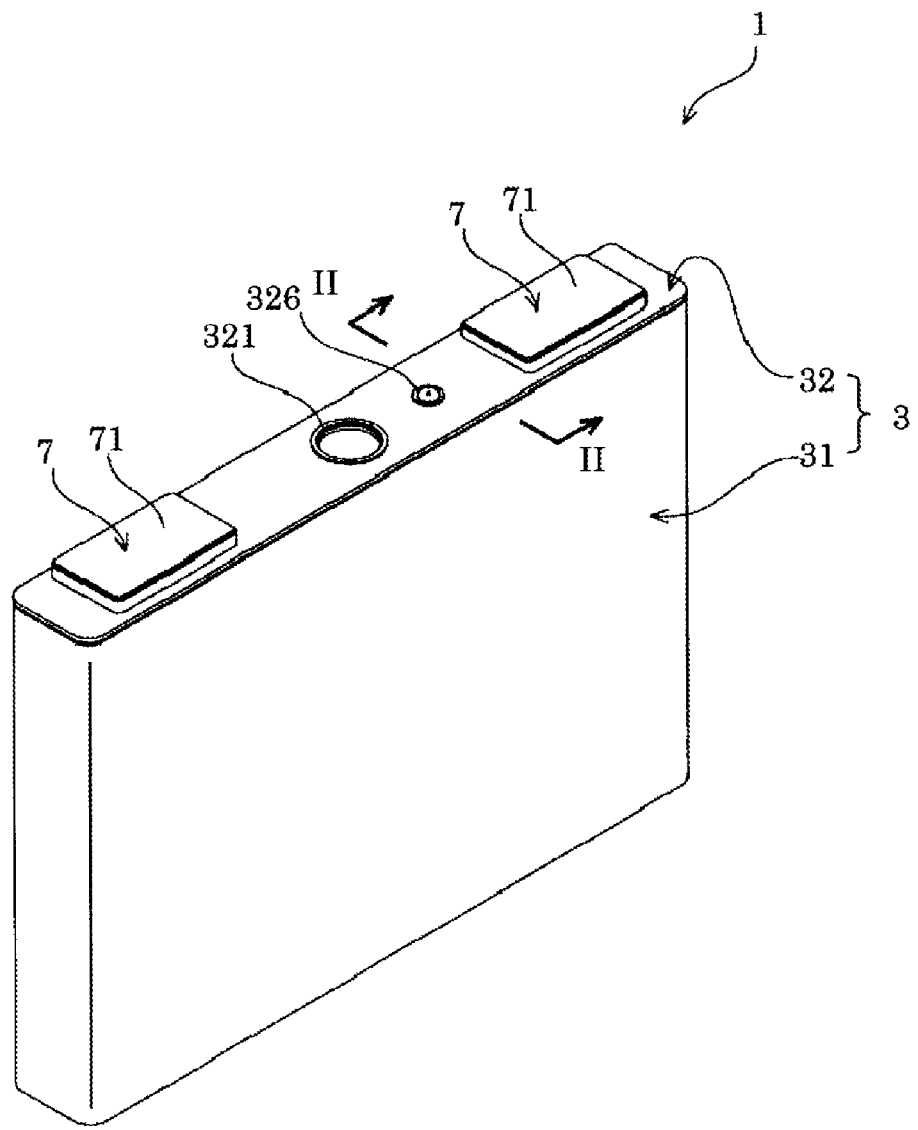
FIG. 1 is a perspective view of an energy storage device according to the present embodiment.
Figure 2:
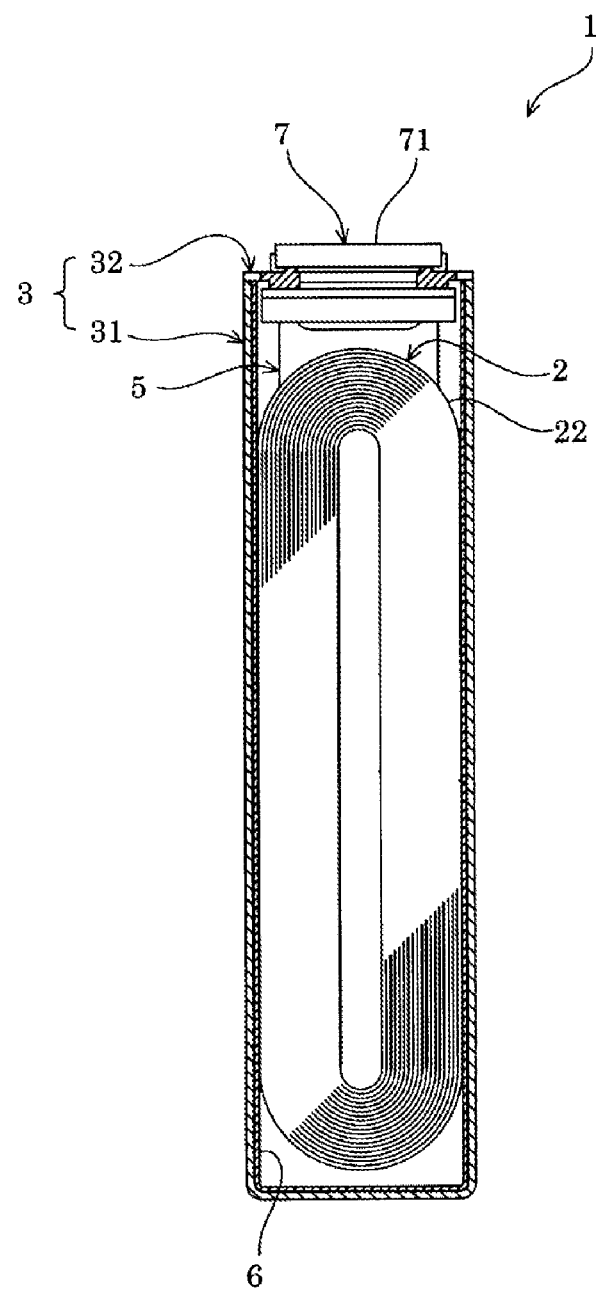
FIG. 2 is a sectional view at a location of the line II-II in FIG. 1.

The energy storage device 1 includes an electrode assembly 2 including a positive electrode and a negative electrode, a case 3 that accommodates the electrode assembly 2, and an external terminal 7 that is disposed outside the case 3 and conducts with the electrode assembly 2 as illustrated in FIGS. 1 and 2. In addition to the electrode assembly 2, the case 3, and the external terminal 7, the energy storage device 1 also includes a current collecting member 5 that conducts the electrode assembly 2 and the external terminal 7 to each other.

The electrode assembly 2 is formed by winding a layered product 22 in which a positive electrode and a negative electrode are layered in a state of being insulated from each other by a separator.

The positive electrode includes a metal foil (current collector) and a positive active material layer that is superimposed on the surface of the metal foil and contains an active material. In the present embodiment, the positive active material layer is superimposed on both surfaces of the metal foil. The thickness of the positive electrode may be 40 μm or more and 150 μm or less.

The metal foil has a strip shape. The metal foil of the positive electrode in the present embodiment is, for example, an aluminum foil. The positive electrode has a non-covered portion of the positive active material layer (the part at which the positive active material layer is not formed) at one edge portion in the width direction that is the lateral direction of the strip shape.

The positive active material layer contains a particulate active material (active material particles), a particulate auxiliary conductive agent, and a binder. The thickness (for one layer) of the positive active material layer may be 12 μm or more and 70 μm or less. The basis weight (for one layer) of the positive active material layer may be 0.4 g/100 cm$^2$ or more and 1.7 g/100 cm$^2$ or less. The density of the positive active material layer may be 1.5 g/cm$^3$ or more and 3.0 g/cm$^3$ or less. The basis weight and density are for one layer disposed so as to cover one surface of the metal foil.

The basis weight of the positive active material layer can be calculated by the following method. In the case of measuring the density of a manufactured and used battery, the battery is discharged to 2.0 V at a current of 3 A (current equivalent to 1 C in a case in which the rated capacity of the battery can be determined) and then held at 2.0 V for 5 hours. After being held, the battery is allowed to rest for 5 hours, and the electrode assembly is taken out from the inside of the case in a dry room or a glove box in an argon atmosphere. The positive electrode taken out from the electrode assembly is washed three times or more with DMC (dimethyl carbonate) having a purity of 99.9% or more and a water content of 20 ppm or less. After that, DMC is removed by vacuum drying. Thereafter, a test piece having a set area S (cm$^2$), for example, a size of 4 cm$^2$ (2 cm×2 cm) is cut out from the positive electrode and the weight W1 (mg) thereof is measured. The active material layer and the metal foil are separated from each other by immersing the test piece in pure water, and the like. After separation, the weight W2 (mg) of the metal foil is measured. The basis weight of the active material layer is calculated by (W1−W2))/S.

The average secondary particle size D50 of the active material particles in the positive active material layer may be 2.0 μm or more and 20 μm or less. The average secondary particle size D50 is determined by a laser diffraction/scattering method.

The porosity of the positive active material layer may be 20% or more and 50% or less. The porosity may be 45% or less. The porosity is measured by a mercury intrusion method. The mercury intrusion method can be carried out using a mercury intrusion porosimeter. Specifically, the mercury intrusion method is carried out in conformity with Japanese Industrial Standards (JIS R1655: 2003). The porosity p (%) is calculated by p=(A/V)×100 from the mercury intrusion quantity A (cm$^3$) measured by the mercury intrusion method and the apparent volume V (cm$^3$) of the positive active material layer. Here, the apparent volume V (cm$^3$) is attained by multiplying the area (cm$^2$) of the active material layer in plan view by the thickness (cm) of the active material layer. Incidentally, in the case of measuring the porosity of the positive active material layer in the manufactured battery, for example, the battery is discharged and then disassembled in a dry atmosphere. Next, the positive active material layer is taken out from the battery, washed with dimethyl carbonate, and then vacuum-dried for 2 hours or more. After that, the measurement is performed using a mercury intrusion porosimeter and the porosity of the positive active material layer can be calculated from the measurement results.

The active material of the positive electrode is a compound capable of intercalating and deintercalating lithium ions. The active material of the positive electrode is, for example, a lithium-transition metal oxide. Specifically, the active material of the positive electrode is, for example, a composite oxide ($Li_pCo_sO_2$, $Li_pNi_qO_2$, $Li_pMn_rO_4$, $Li_pNi_{q^-}Co_sMn_rO_2$ and the like) represented by $Li_pMeO$ (Me represents one or two or more transition metals) or a polyanion compound ($Li_pFe_uPO_4$, $Li_pMn_uPO_4$, $Li_pMn_uSiO_4$, $Li_pCo_uPO_4F$ and the like) represented by $Li_pMe_u(XO_v)_w$ (Me represents one or two or more transition metals and X represents P, Si, B, or V).

In the present embodiment, the active material of the positive electrode is a lithium-transition metal composite oxide that has an α-NaFeO$_2$ type structure and is represented by a chemical composition of $Li_{1+x}M_{1-x}O_2$ (where M is a transition metal and 0<x<0.3) and is a lithium-transition metal composite oxide represented by a chemical composition of $Li_pNi_qMn_rCo_sO_t$ (where 0<p≤1.3, q+r+s=1, 0≤q≤1, 0≤r≤1, 0≤s≤1, and 1.7≤t≤2.3) in more detail. In addition, it is preferable that 0<q<1, 0<r<1, and 0<s<1.

The lithium-transition metal composite oxide represented by a chemical composition of $Li_pNi_qMn_rCo_sO_t$ as described above is, for example, $LiNi_{1/3}Co_{1/3}Mn_{1/3}O_2$, $LiNi_{3/5}Co_{1/5}Mn_{1/5}O_2$, $LiNi_{4/5}Co_{1/10}Mn_{1/10}O_2$ and the like.

In the present embodiment, the charge capacity (charge current per unit area of electrode: 0.5 mA/cm$^2$) is preferably 110 mAh/g or more and 230 mAh/g or less in a case in which the potential of the positive electrode is set to 4.25 V with respect to a lithium potential. In addition, the charge capacity is more preferably 150 mAh/g or more and 200 mAh/g or less and still more preferably 160 mAh/g or more and 180 mAh/g or less.

In a case in which the active material of the positive electrode is a lithium-transition metal oxide having the above composition and the charge capacity is within the above numerical range, both a relatively high weight energy density and durability can be achieved in the relation with the charge-discharge capacity of the carbon material (non-graphitizable carbon) used in the negative electrode.

The binder used in the positive active material layer is, for example, polyvinylidene fluoride (PVdF), a copolymer of ethylene and vinyl alcohol, polymethyl methacrylate, polyethylene oxide, polypropylene oxide, polyvinyl alcohol, polyacrylic acid, polymethacrylic acid, and styrene-butadiene rubber (SBR). The binder in the present embodiment is polyvinylidene fluoride.

The auxiliary conductive agent of the positive active material layer is a carbonaceous material containing carbon at 98% by mass or more. The carbonaceous material is, for example, Ketjen Black (registered trademark), acetylene black, and graphite. The positive active material layer in the present embodiment contains acetylene black as the auxiliary conductive agent.

The negative electrode includes a metal foil (current collector) and a negative active material layer formed on the metal foil. In the present embodiment, the negative active material layer is superimposed on both surfaces of the metal foil. The metal foil has a strip shape. The material for the metal foil is preferably aluminum or an aluminum alloy. In the present embodiment, the metal foil is an aluminum foil or an aluminum alloy foil and is preferably an aluminum foil. The aluminum alloy is an alloy containing aluminum at 90% by mass or more. A conductive layer may be formed on the surface of the metal foil containing aluminum. As the metal foil contains aluminum, it is considered that melting of the metal foil is suppressed and resistance to overdischarge is exerted even in a case in which the energy storage device is in an overdischarged state. The negative electrode has a non-covered portion of the negative active material layer (the part at which the negative active material layer is not formed) at one edge portion in the width direction that is the lateral direction of the strip shape. The thickness of the negative electrode may be 40 μm or more and 150 μm or less.

The thickness (for one layer) of the negative active material layer may be 10 μm or more and 100 μm or less. The basis weight (for one layer) of the negative active material layer may be 0.2 g/100 cm$^2$ or more and 1.0 g/100 cm$^2$ or less. The density (for one layer) of the negative active material layer may be 0.5 g/cm$^3$ or more and 6.0 g/cm$^3$ or less.

The basis weight of the negative active material layer is calculated similarly to the basis weight of the positive active material layer. At the part at which the positive active material layer and the negative active material layer face each other, the following Relational Expression (1) may be satisfied when the basis weight of the positive active material layer is denoted as VP and the basis weight of the negative active material layer is denoted as VN. By such a configuration, it is possible to obtain the energy storage device 1 exhibiting resistance to overdischarge. The basis weight is measured similarly to the method described above.

$$0.4 \leq VN/VP \leq 0.6 \quad \text{Relational Expression (1)}$$

The negative active material layer contains a particulate active material (active material particles) and a binder. The negative active material layer is disposed so as to face the positive electrode with the separator interposed therebetween. The width of the negative active material layer is wider than the width of the positive active material layer.

The active material of the negative electrode can contribute to the electrode reactions such as charge reaction and discharge reaction in the negative electrode. The active material of the negative electrode in the present embodiment is amorphous carbon. More specifically, the active material of the negative electrode is nongraphitizable carbon.

Here, amorphous carbon is one in which the average interplanar spacing $d_{002}$ of (002) plane determined by a wide angle X-ray diffraction method using CuKα rays as a radiation source in the discharge state is 0.340 nm or more and 0.390 nm or less. In addition, the nongraphitizable carbon is one in which the average interplanar spacing $d_{002}$ is 0.360 nm or more and 0.390 nm or less.

The amorphous carbon of the active material of the negative electrode exhibits the following physical properties. The curve attained by determining a rate of change (dQ/dV) in a potential (V) of the amorphous carbon in a discharge capacity (Q) of the amorphous carbon per unit quantity of the amorphous carbon based on the result attained by measuring (measured at the time of discharge) the potential (V) with respect to the discharge capacity (Q) and representing the rate of change (dQ/dV) with respect to the potential (V) has one or more peaks in a range in which the potential of the amorphous carbon is 0.8 V or more and 1.5 V or less. The height of this peak is preferably 300 mAh/g·V or more. It is possible to obtain the energy storage device 1 having a higher initial capacity as the height of this peak is 300 mAh/g·V or more. The height of this peak may be 1500 mAh/g·V or less. The curve usually has one peak. The curve is determined by the method described in Examples. Incidentally, the fact that the curve has a peak can be confirmed by visually observing the entire curve and also by the following method. In the graph illustrating the curve, it can be confirmed that the curve has a peak in a case in which the discharge capacity at which the potential (V) changes by 0.1 V is calculated, the average value of the rate of change (dQ/dV) is calculated, and the average value of the rate of change (dQ/dV) calculated once increases and then decreases in a range in which the potential of amorphous carbon is 0.8 V or more and 1.5 V or less.

Amorphous carbon exhibiting the physical properties can be obtained by setting the firing temperature at the time of production to 1000° C. or less. The peak further increases in size as the firing temperature is set to 900° C. or less. As described above, amorphous carbon in the present embodiment is fabricated by being fired at a relatively low temperature. On the other hand, conventional general amorphous carbon is fabricated at a firing temperature of 1300° C. or more.

The binder used in the negative active material layer is similar to the binder used in the positive active material layer. The binder in the present embodiment is styrene-butadiene rubber (SBR) and carboxymethyl cellulose (CMC).

In the negative active material layer, the proportion of the binder may be 0.5% by mass or more and 10% by mass or less with respect to the total mass of the active material particles and the binder.

The negative active material layer may further contain an auxiliary conductive agent such as Ketjen Black (registered trademark), acetylene black, or graphite. The negative active material layer of the present embodiment does not contain an auxiliary conductive agent.

When the battery is charged with electricity to the upper limit voltage (when fully charged), the potential of the positive electrode may be 3.85 V or more and 4.5 V or less [vs. Li$^+$/Li]. On the other hand, when the battery is charged with electricity to the upper limit voltage (when fully charged), the potential of the negative electrode is 0.25 V or more. When the battery is charged with electricity to the upper limit voltage (when fully charged), the potential of the negative electrode may be 0.35 V or more and 0.4 V or less [vs. $Li^+/Li$]. As the potential of the negative electrode is 0.25 V or more when the battery is charged with electricity to the upper limit voltage (when fully charged), the battery can have a relatively high initial capacity. In addition, as this potential is 0.25 V or more, it is possible to suppress the occurrence of alloying reaction between lithium and aluminum of the current collector, thus to select aluminum as the current collector of the negative electrode, and to obtain the energy storage device 1 exhibiting excellent overdischarge characteristics. As the potential of the negative electrode is 0.4 V or less when the battery is charged with electricity to the upper limit voltage (when fully charged), the capacity of the battery can be increased. Incidentally, it is possible to adjust the potential of the negative electrode when the battery is charged with electricity to the upper limit voltage (when fully charged) by changing the basis weight ratio between the active material layer of the positive electrode and the active material layer of the negative electrode. The potential of the negative electrode can be set high by, for example, increasing the value of VN/VP described above.

In the energy storage device 1 which includes a positive electrode containing a lithium-transition metal composite oxide that has an α-$NaFeO_2$ type structure and is represented by a chemical composition of $Li_{1+x}M_{1-x}O_2$ (here, M is a transition metal and 0<x<0.3) as an active material and is designed so that the voltage of the negative electrode is 0.25 V or more in a case in which the voltage of the energy storage device 1 reaches 3.6 V, the normal upper limit of the operating voltage is 3.6 V. In a case in which a plurality of such energy storage devices 1 are connected in series, preferably four energy storage devices 1 are connected in series, the voltage compatibility with the conventional power sources for motor vehicles equipped with a lead-acid battery is achieved and thus the connected energy storage devices 1 can be used as a substitute for the lead-acid battery. When such an energy storage apparatus is used as a substitute for a lead-acid battery, deep discharge which cannot be achieved by a lead-acid battery is possible, and in addition, it is possible to save the weight.

In the electrode assembly 2 in the present embodiment, the positive electrode and the negative electrode configured as described above are wound in a state of being insulated by the separator. In other words, in the electrode assembly 2 in the present embodiment, the layered product 22 of the positive electrode, the negative electrode, and the separator is wound. The separator is a member exhibiting an insulating property. The separator is disposed between the positive electrode and the negative electrode. By this, the positive electrode and the negative electrode are insulated from each other in the electrode assembly 2 (in detail, the layered product 22). In addition, the separator retains the electrolyte solution in the case 3. By this, at the time of charge and discharge of the energy storage device 1, lithium ions move between the positive electrodes and the negative electrodes which are alternately layered with the separator interposed therebetween.

The separator has a strip shape. The separator includes a porous separator substrate. The separator is disposed between the positive electrode and the negative electrode in order to prevent a short circuit between the positive electrode and the negative electrode. The separator in the present embodiment includes only the separator substrate.

The separator substrate is configured to be porous. The separator substrate is, for example, a woven fabric, a non-woven fabric, or a porous film. Examples of the material for the separator substrate include a polymer compound, glass, and ceramics. Examples of the polymer compound include at least one selected from the group consisting of polyacrylonitrile (PAN), polyamide (PA), polyester such as polyethylene terephthalate (PET), polyolefins (PO) such as polypropylene (PP) and polyethylene and (PE), and cellulose.

The width of the separator (the dimension in the lateral direction of the strip shape) is slightly wider than the width of the negative active material layer. The separator is disposed between the positive electrode and the negative electrode which are superimposed in a state of being displaced in the width direction so that the positive active material layer and the negative active material layer overlap each other. At this time, the non-covered portion of the positive electrode and the non-covered portion of the negative electrode do not overlap each other. In other words, the non-covered portion of the positive electrode protrudes in the width direction from the region in which the positive electrode and the negative electrode overlap each other and the non-covered portion of the negative electrode protrudes in the width direction (the direction opposite to the protruding direction of the non-covered portion of the positive electrode) from the region in which the positive electrode and the negative electrode overlap each other. The positive electrode, the negative electrode, and the separator in the layered state, namely, the layered product 22 is wound to form the electrode assembly 2.

The case 3 includes a case body 31 having an opening and a lid plate 32 which closes (shuts) the opening of the case body 31. The case 3 accommodates the electrolyte solution in the internal space together with the electrode assembly 2, the current collecting member 5 and the like. The case 3 is formed of a metal exhibiting resistance to the electrolyte solution. The case 3 is formed of, for example, an aluminum-based metal material such as aluminum or an aluminum alloy. The case 3 may be formed of metal materials such as stainless steel and nickel, a composite material in which a resin such as nylon is bonded to aluminum, or the like.

The electrolyte solution is a nonaqueous solution-based electrolyte solution. The electrolyte solution is obtained by dissolving an electrolyte salt in an organic solvent. The organic solvent is, for example, cyclic carbonic acid esters such as propylene carbonate and ethylene carbonate and chain carbonates such as dimethyl carbonate, diethyl carbonate, and ethyl methyl carbonate. The electrolyte salt is $LiClO_4$, $LiBF_4$, $LiPF_6$ and the like. The electrolyte solution in the present embodiment is prepared by dissolving 0.5 to 1.5 mol/L of $LiPF_6$ in a mixed solvent in which propylene carbonate, dimethyl carbonate, and ethyl methyl carbonate are mixed together at predetermined proportions.

The lid plate 32 include a gas release valve 321 capable of releasing gas in the case 3 to the outside. The gas release valve 321 releases gas from the inside of the case 3 to the outside when the internal pressure of the case 3 increases to a predetermined pressure. The gas release valve 321 is provided at the center of the lid plate 32.

The case 3 is provided with an electrolyte solution filling hole for filling the electrolyte solution. The electrolyte solution filling hole communicates the inside of the case 3 and the outside to each other. The electrolyte solution filling hole is provided to the lid plate 32. The electrolyte solution filling hole is sealed (closed) with an electrolyte solution filling plug 326. The electrolyte solution filling plug 326 is fixed to the case 3 (the lid plate 32 in the example of the present embodiment) by welding.

The external terminal 7 is the part that is electrically connected to the external terminal 7 of another energy storage device 1, an external instrument, or the like. The external terminal 7 is formed of a conductive member. The external terminal 7 has a surface 71 to which a bus bar and the like can be welded. The surface 71 is a flat surface.

The current collecting member 5 is disposed in the case 3 and is directly or indirectly connected to the electrode assembly 2 so as to be able to conduct electricity. The current collecting member 5 in the present embodiment is formed of a conductive member. As illustrated in FIG. 2, the current collecting member 5 is disposed along the inner surface of the case 3. The current collecting member 5 is conducted to each of the positive electrode and the negative electrode of the energy storage device 1.

In the energy storage device 1 of the present embodiment, the electrode assembly 2 (in detail, the electrode assembly 2 and the current collecting member 5) in a state of being accommodated in a bag-shaped insulating cover 6 which insulates the electrode assembly 2 from the case 3 is accommodated in the case 3.

Next, a method for manufacturing the energy storage device 1 of the above embodiment will be described.

In the method for manufacturing the energy storage device 1, first, a metal foil (current collector) is coated with a mixture containing an active material to form an active material layer, and thus electrodes (a positive electrode and a negative electrode) are fabricated. Next, the positive electrode, the separator, and the negative electrode are superimposed to form the electrode assembly 2. Subsequently, the electrode assembly 2 is filled in the case 3 and the electrolyte solution is placed in the case 3 to assemble the energy storage device 1.

In the fabrication of the electrode (positive electrode), a positive active material layer is formed by applying a mixture containing an active material, a binder, and a solvent on both surfaces of a metal foil. By changing the amount of the mixture applied, the thickness and basis weight of the positive active material layer can be adjusted. A general method is employed as a coating method for forming the positive active material layer. Furthermore, the positive active material layer is roll-pressed at a predetermined pressure. By changing the pressing pressure, the thickness and density of the positive active material layer can be adjusted. Incidentally, the negative electrode is similarly fabricated.

In the formation of the electrode assembly 2, the electrode assembly 2 is formed by winding the layered product 22 in which the separator is sandwiched between the positive electrode and the negative electrode. In detail, the layered product 22 is fabricated by superimposing the positive electrode, the separator, and the negative electrode so that the positive active material layer and the negative active material layer face each other with the separator interposed therebetween. The electrode assembly 2 is formed by winding the layered product 22.

In the assembly of the energy storage device 1, the electrode assembly 2 is placed in the case body 31 of the case 3, the opening of the case body 31 is closed with the lid plate 32, and the electrolyte solution is filled in the case 3. When the opening of the case body 31 is closed with the lid plate 32, the opening of the case body 31 is closed with the lid plate 32 in a state in which the electrode assembly 2 is placed inside the case body 31, and the positive electrode and one external terminal 7 are conducted to each other, and the negative electrode and the other external terminal 7 are conducted to each other. When the electrolyte solution is filled in the case 3, the electrolyte solution is filled in the case 3 through the filling hole of the lid plate 32 of the case 3.

The energy storage device 1 of the present embodiment configured as described above is usually used so that the potential of the negative electrode does not reach the alloying potential of aluminum and lithium since the metal foil of the negative electrode is aluminum.

The energy storage device 1 of the present embodiment configured as described above includes a negative electrode having a negative active material layer containing amorphous carbon as an active material. The curve attained by determining a rate of change (dQ/dV) in a potential (V) of the amorphous carbon in a discharge capacity (Q) of the amorphous carbon per unit quantity of the amorphous carbon based on the result attained by measuring the potential (V) with respect to the discharge capacity (Q) and representing the rate of change (dQ/dV) with respect to the potential (V) has one or more peaks in a range in which the potential of the amorphous carbon is 0.8 V or more and 1.5 V or less. The potential of the negative electrode when the energy storage device 1 is fully charged with electricity is 0.25 V or more with respect to a lithium potential.

Amorphous carbon exhibiting the physical properties is configured to have a pore structure different from that of conventional amorphous carbon, and thus the curve has the above peak. It is presumed that the amount of charge increases to the extent to which the amorphous carbon has the above peak and the energy storage device 1 can attain a higher capacity. In addition, it is considered that the potential of the negative electrode at the time of full charge is 0.25 V or more with respect to a lithium potential and thus increases in hysteresis of the energy storage device 1 at the time of charge and at the time of discharge are suppressed.

Consequently, it is possible to provide an energy storage device having a suppressed increase in hysteresis at the time of charge and at the time of discharge while having a relatively high initial capacity by the above configuration. Incidentally, in the energy storage device 1 having a suppressed increase in hysteresis, it is relatively easy to control charge and discharge.

It should be noted that the energy storage device of the present invention is not limited to the above embodiment, and it goes without saying that various changes can be made without departing from the scope of the present invention. For example, the configuration of another embodiment can be added to the configuration of one embodiment, and a part of the configuration of one embodiment can be replaced with the configuration of another embodiment. Furthermore, a part of the configuration of one embodiment can be deleted.

In the above embodiment, the positive electrode and the negative electrode in which the active material layer containing an active material is in direct contact with the metal foil have been described in detail, but the positive electrode or the negative electrode may have a conductive layer which contains a binder and an auxiliary conductive agent and is disposed between the active material layer and the metal foil in the present invention. In other words, the metal foil of the positive electrode or the negative electrode may be superimposed on the active material layer with the conductive layer interposed therebetween.

In the above embodiment, electrodes in which the active material layer is disposed on both surfaces of the metal foil of the respective electrodes have been described, but the positive electrode or the negative electrode may have the active material layer only on one surface of the metal foil in the energy storage device of the present invention.

In the above embodiment, the energy storage device 1 including the electrode assembly 2 fabricated by winding the layered product 22 has been described in detail, but the energy storage device of the present invention may include the unwound layered product 22. In detail, the energy storage device may include an electrode assembly in which a positive electrode, a separator, a negative electrode, and a separator each having a rectangular shape are stacked in this order a plurality of times.

In the above embodiment, a case in which the energy storage device 1 is used as a chargeable-dischargeable nonaqueous electrolyte secondary battery (for example, a lithium ion secondary battery) has been described, but the kind and size (capacity) of the energy storage device 1 are arbitrary. In addition, in the above embodiment, the lithium ion secondary battery has been described as an example of the energy storage device 1, but the present invention is not limited to this. For example, the present invention can be applied to various secondary batteries and other energy storage devices of capacitors such as electric double layer capacitors.

Figure 4:
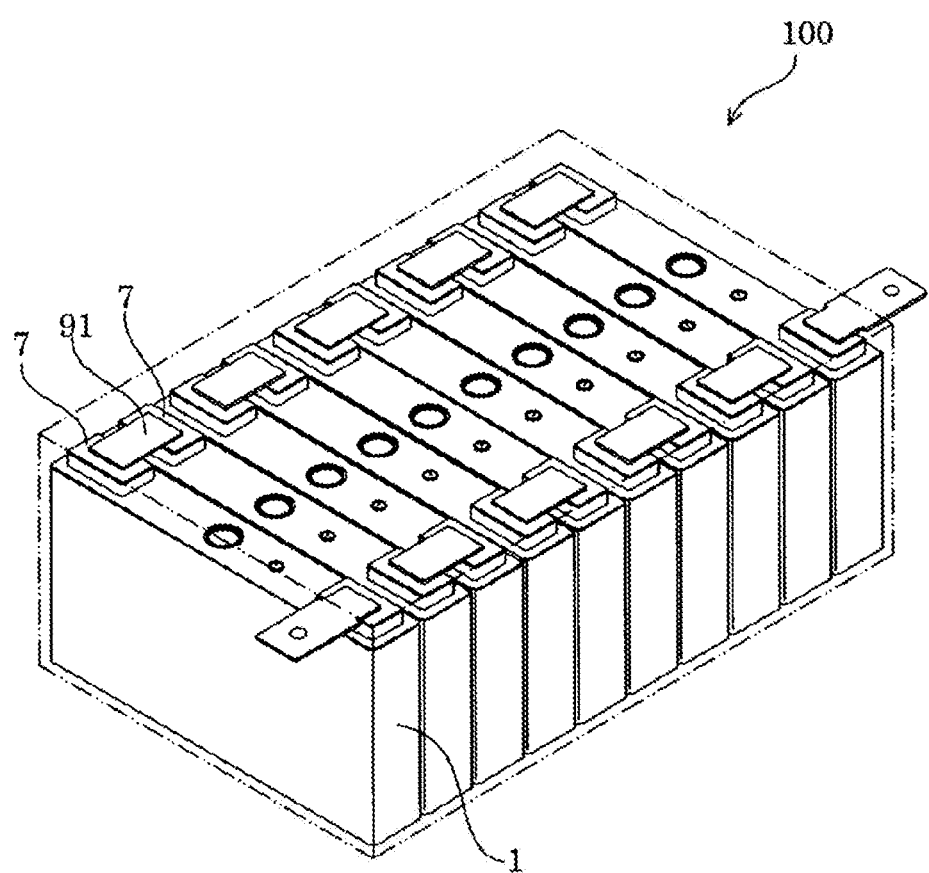
FIG. 4 is a perspective view of an energy storage apparatus including an energy storage device according to the same embodiment.

The energy storage device 1 (for example, a battery) may be used in an energy storage apparatus 100 (a battery module in a case in which the energy storage device is a battery) as illustrated in FIG. 4. The energy storage apparatus 100 includes at least two (a plurality of, for example, four) energy storage devices 1 and a bus bar member 91 which electrically connects two adjacent energy storage devices 1 to each other. It is preferable that the plurality of energy storage devices 1 are connected in series. The technology of the present invention may be applied to some of the plurality of energy storage devices or may be applied to all of the plurality of energy storage devices.

<Mechanism that Suppresses Increase in Hysteresis>

In the negative active material (amorphous carbon), there are a plurality of sites into which Li ions can be inserted and the energy levels (zero point energy) of the respective sites are different from each other. At the time of charge, first, Li ions are inserted into a site at a low energy level and the potential energy of this site increases (transitions). After that, Li ions move to another site (since the energy level of another site has decreased to be lower as a result) at the time point at which the potential energy curve (energy level) intersects that of another site. In addition, internal energy is released as energy to the outside by the energy stabilization. At the time of discharge, a phenomenon opposite to this occurs. This inter-site movement of Li ions depending on the energy level difference in the negative active material at the time of charge and discharge is a factor which causes hysteresis at the time of charge and discharge.

In other words, hysteresis does not occur if inter-site movement of Li ions is restricted. Consequently, it is considered that hysteresis does not occur if charge and discharge is performed under a condition having a shallow depth of charge so that the energy levels do not intersect each other. Amorphous carbon according to the present invention has one or more peaks in a range in which the potential (V) is 0.8V or more and 1.5V or less in a curve representing the rate of change (dQ/dV) in the discharge capacity per unit quantity with respect to the potential (V), and thus the battery has a relatively high initial capacity even when being charged and discharged with electricity under a condition having a shallow depth of charge so that the energy levels do not intersect each other by setting the potential of the negative electrode at the time of full charge to 0.25 V or more with respect to the metal lithium potential.

Incidentally, it is possible to fabricate amorphous carbon having desired conditions by adjusting the firing temperature.

EXAMPLES

A nonaqueous electrolyte secondary battery (lithium ion secondary battery) was manufactured as described below.

Example 1

(1) Fabrication of Positive Electrode

A mixture for positive electrode was prepared by mixing and kneading N-methyl-2-pyrrolidone (NMP) as a solvent, an auxiliary conductive agent (acetylene black), a binder (PVdF), and an active material ($LiNi_{1/3}Co_{1/3}Mn_{1/3}O_2$, D50: 4.0 μm) particles. The mixing amounts of the auxiliary conductive agent, the binder, and the active material were set to 4.5% by mass, 2.5% by mass, and 93% by mass, respectively. The prepared mixture for positive electrode was applied on both surfaces of an aluminum foil (thickness: 12 μm) so that the applied amount (basis weight) thereof after drying was 0.613 g/100 cm$^2$. The applied amount was set so that the potential of the positive electrode was 4.00 V [vs. Li$^+$/Li] when the battery was charged with electricity to the battery upper limit voltage presented in Table 1. After drying, roll pressing was performed. Thereafter, the resultant was vacuum-dried to remove moisture and the like. The thickness (for one layer) of the active material layer after pressing was 64 μm. The porosity of the active material layer was 42%.

(2) Fabrication of Negative Electrode

As an active material, particulate amorphous carbon (non-graphitizable carbon) was used (to be described in detail later). In addition, PVdF was used as a binder. The mixture for negative electrode was prepared by mixing and kneading NMP as a solvent, the binder, and the active material. PVdF was mixed so as to be 4% by mass in terms of solid content and the active material was mixed so as to be 96% by mass in terms of solid content. The prepared mixture for negative electrode was applied on both surfaces of an aluminum foil (thickness: 12 μm) so that the applied amount (basis weight) after drying was 0.3 g/100 cm$^2$. The applied amount was set so that the potential of the negative electrode was 4.00 V [vs. Li$^+$/Li] when the battery was charged with electricity to the battery upper limit voltage presented in Table 1. After drying, roll pressing was performed, and the resultant was vacuum-dried to remove moisture and the like. The thickness (for one layer) of the active material layer was 71 μm. The porosity of the active material layer was 32%.

(3) Separator

A polyethylene microporous film having a thickness of 22 μm was used as the separator. The degree of resistance to air permeation of the polyethylene microporous film was 100 sec/100 cc.

(4) Preparation of Electrolyte Solution

As the electrolyte solution, one prepared by the following method was used. As a nonaqueous solvent, a solvent prepared by mixing one part by volume of propylene carbonate, one part by volume of dimethyl carbonate, and one part by volume of ethyl methyl carbonate was used. LiPF$_6$ was dissolved in this nonaqueous solvent so that the salt concentration was 1 mol/L to prepare an electrolyte solution.

(5) Disposition of Electrode Assembly in Case

A battery was manufactured by a general method using the positive electrode, the negative electrode, the electrolyte solution, the separator, and a case.

First, a sheet-shaped product obtained by disposing the separator between the positive electrode and the negative electrode and layering these was wound. Next, the wound electrode assembly was disposed in the case body of a prismatic aluminum container as a case. Subsequently, the positive electrode and the negative electrode were electrically connected to two external terminals, respectively. Furthermore, a lid plate was attached to the case body. The electrolyte solution was filled in the case through the electrolyte solution filling port formed on the lid plate of the case. Finally, the case was sealed by sealing the electrolyte solution filling port of the case.

Examples 2 to 5 and Comparative Examples 1 to 3

Lithium ion secondary batteries were manufactured in the same manner as in Example 1 except that the configurations of the respective batteries were changed to those presented in Table 1 by changing the kind of amorphous carbon as an active material of the negative electrode, changing the basis weight of the negative electrode when being fabricated in a range of 0.132 to 0.760 g/100 cm$^2$, or the like. The lithium ion secondary batteries were designed so that the negative electrode potential at the upper limit voltage had the values presented in Table 1.

In detail, the same amorphous carbon (Sample 1) as that in Example 1 was used as the active material of the negative electrode in Examples 2 to 4. In Example 5, amorphous carbon (Sample 2 different from Sample 1) having one peak in the curve representing the rate of change (dQ/dV) with respect to the potential (V) was used as the active material of the negative electrode. Incidentally, the height of the peak was 300 mAh/g·V or more in the amorphous carbon of Sample 1 and Sample 2.

In Comparative Examples 2 and 3, amorphous carbon having no peak in the curve representing the rate of change (dQ/dV) with respect to the potential (V) was used as the active material of the negative electrode. In Comparative Example 1, the amorphous carbon of Sample 1 was used as the active material of the negative electrode.

Figure 3:
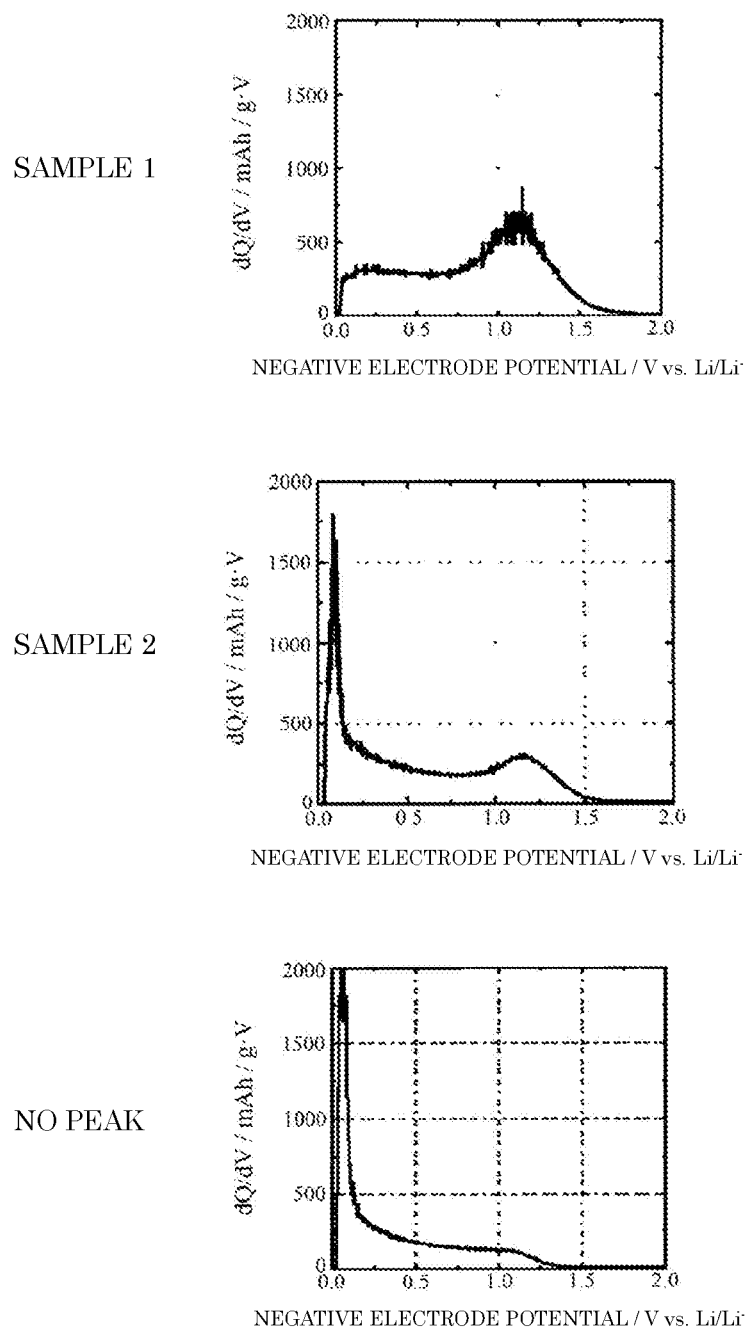
FIG. 3 is graphs each illustrating an example of physical properties of amorphous carbon as an active material of a negative electrode.

The curves representing the rate of change (dQ/dV) with respect to the potential (V) for the Sample 1, the Sample 2, and the amorphous carbon having no peak are illustrated in FIG. 3, respectively. Sample 1 was obtained by performing firing at 900° C., and Sample 2 was obtained by performing firing at 1000° C. The amorphous carbon having no peak was obtained by performing firing at 1300° C.

The curves illustrated in FIG. 3 were attained by determining a rate of change (dQ/dV) in a potential (V) of the amorphous carbon in a discharge capacity (Q) of the amorphous carbon per unit quantity of the amorphous carbon based on the result attained by measuring the potential (V) with respect to the discharge capacity (Q) and representing the rate of change (dQ/dV) with respect to the potential (V). The curves are attained by measuring the electric quantity of amorphous carbon at the time of discharge. In this measuring method, amorphous carbon was subjected to a predetermined pretreatment and then the electric quantity thereof with respect to the potential at the time of discharge was measured.

(Pretreatment)

The battery was discharged to 2.0 V at a current of 5 A and then held at 2.0 V for 5 hours. After being held, the battery was allowed to rest for 5 hours, and the electrode assembly was taken out from the inside of the case in a dry room or a glove box in an argon atmosphere. The negative electrode taken out from the electrode assembly was washed three times or more with DMC having a purity of 99.9% or more and a water content of 20 ppm or less. After that, DMC was removed by vacuum drying.

(Method for Measuring Electric Quantity at Time of Discharge)

The negative electrode was taken out from the battery by a pretreatment as described above, and then a three-electrode cell was fabricated using a negative electrode (working electrode) cut out to 3.0 cm×2.5 cm, a counter electrode (Li metal), and a reference electrode (Li metal). The same separator and electrolyte solution as those described in the present Example 1 were used as the separator and electrolyte solution. The fabricated cell was subjected to constant voltage charge to 0.01 V for 24 hours at a current value with a current density of 0.5 mA/cm$^2$. The cell was allowed to rest for 10 minutes and subjected to constant current discharge to 2.0 V at the same current density. The calculated value of the discharge capacity in such an operation was set to 1 CmA. An operation to perform constant current charge for 36 seconds at a current value of 1 CmA and then take a rest for 720 seconds was performed ninety nine times and further constant voltage charge was performed at 0.01 V for 30 minutes at the same current value using the same cell. Subsequently, after a rest of 720 seconds, the lower limit voltage was set to 2.0 V at the same current value, and an operation to perform constant current discharge for 36 seconds and then take a rest for 720 seconds was performed one hundred times. The value (rate of change) attained by dividing the difference between the respective potentials after the discharge and rest in the measurement order adjacent to each other by the difference between the respective discharge capacity corresponding to the respective potentials was defined as dQ/dV. The curve representing the rate of change (dQ/dV) with respect to each potential (V) after the discharge and rest had one peak in a range in which the potential of amorphous carbon was 0.8 V or more and 1.5 V or less in the amorphous carbon of Sample 1 and Sample 2.

<Measurement of Initial Capacity>

The battery was subjected to constant current charge to 3.6 V at 3 A and 25° C. and then subjected to constant voltage charge at 3.6 V, whereby the battery was charged with electricity for 3 hours in total by the constant current charge and the constant voltage charge. After that, the battery was discharged to 2.4 V at a constant current of 3 A. This discharge capacity was defined as the "initial capacity".

<Measurement of Hysteresis at Time of Charge and at Time of Discharge>

Hysteresis was calculated under the following conditions. The initial capacity calculated above was set to 1 CA, and discharge was performed at a constant current of 3 A under the condition set to a final voltage of 2.4 V, and then an operation in which the battery was charged with electricity for 36 seconds at 1 CA and allowed to rest for 720 seconds was adopted as one time of charge, the same charge was repeated ninety nine times to perform constant voltage charge at 3.6V and 1.5 A for 3600 seconds. Thereafter, an operation in which the battery was discharged for 36 seconds at 1 CA and allowed to rest for 720 seconds was adopted as one time of discharge, and the same discharge was repeated one hundred times. The voltage after rest at the time of each charge was defined as OCV at the time of charge, the voltage after rest at the time of each discharge was defined as OCV at the time of discharge, these were calculated for each SOC, and the difference between OCV at the time of charge and OCV at the time of discharge in each SOC was defined as hysteresis.

The measurement results on the initial capacities of the batteries manufactured in the respective Examples and the respective Comparative Examples and the evaluation results on hysteresis at the time of charge and at the time of discharge are presented in Table 1.

TABLE 1

|  | Amorphous carbon (nongraphitizable carbon) | Negative electrode voltage at 3.6 V (V) | Capacity of energy storage device (Ah) | Maximum hysteresis of energy storage device |
|---|---|---|---|---|
| Example 1 | Sample 1 | 0.4 | 3.23 | 0.04 |
| Example 2 | Sample 1 | 0.35 | 3.14 | 0.05 |
| Example 3 | Sample 1 | 0.3 | 2.91 | 0.07 |
| Example 4 | Sample 1 | 0.25 | 2.54 | 0.11 |
| Comparative Example 1 | Sample 1 | 0.2 | 2.11 | 0.16 |
| Example 5 | Sample 2 | 0.4 | 3.12 | 0.04 |
| Comparative Example 2 | No peak | 0.4 | 2.35 | 0.03 |
| Comparative Example 3 | No peak | 0.05 | 4.36 | 0.15 |

As can be seen from Table 1, the batteries of Examples had a suppressed increase in hysteresis at the time of charge and at the time of discharge while having a relatively high initial capacity.

DESCRIPTION OF REFERENCE SIGNS

1: energy storage device (nonaqueous electrolyte secondary battery)
2: electrode assembly
3: case
31: case body
32: lid plate
5: current collecting member
6: insulation cover
7: external terminal
71: surface
100: energy storage apparatus

The invention claimed is:

1. An energy storage device comprising a negative electrode including a negative active material layer comprising amorphous carbon as an active material, wherein
a curve obtained by determining a rate of change (dQ/dV) in a potential (V) of the amorphous carbon in a discharge capacity (Q) of the amorphous carbon per unit quantity based on a result obtained by measuring the potential (V) with respect to the discharge capacity (Q) and representing the rate of change (dQ/dV) with respect to the potential (V) has one or more peaks in a range in which the potential of the amorphous carbon is 0.8 V or more and 1.5 V or less, and
a potential of the negative electrode at time of full charge is 0.25 V or more with respect to a lithium potential,
the negative electrode includes a metal foil including aluminum.

2. The energy storage device according to claim 1, wherein the potential of the negative electrode at the time of the full charge is 0.35 V or more with respect to the lithium potential.

3. The energy storage device according to claim 1, wherein a height of the peak is 300 mAh/g·V or more.

4. An energy storage apparatus comprising a plurality of the energy storage devices according to claim 1, wherein
the plurality of energy storage devices are connected in series, and
the energy storage devices comprise a positive electrode including a lithium-transition metal composite oxide that includes an α-NaFeO$_2$ type structure and is represented by a chemical composition of Li$_{1+x}$M$_{1-x}$O$_2$ (M is a transition metal and 0<x<0.3) as an active material.

5. An energy storage device comprising a negative electrode including a negative active material layer comprising amorphous carbon as an active material, wherein
a curve obtained by representing a rate of change (dQ/dV) in a discharge capacity (Q) of the amorphous carbon per unit quantity with respect to a potential (V) of the amorphous carbon based on a result obtained by measuring the potential (V) with respect to the discharge capacity (Q) has one or more peaks in a range in which the potential (V) is 0.8 V or more and 1.5 V or less, and
a potential of the negative electrode at time of full charge is 0.25 V or more with respect to a metal lithium potential,
the negative electrode includes a metal foil including aluminum.

6. The energy storage device according to claim 1, wherein the negative active material layer is formed on the metal foil.

7. The energy storage device according to claim 1, wherein the negative active material layer is superimposed on both surfaces of the metal foil.

8. The energy storage device according to claim 1, wherein the metal foil has a strip shape.

9. The energy storage device according to claim 1, wherein the metal foil comprises an aluminum foil or an aluminum alloy foil, the aluminum alloy comprising aluminum at 90% by mass or more.

10. The energy storage device according to claim 1, further comprising a conductive layer formed on a surface of the metal foil including the aluminum.

11. The energy storage device according to claim 5, wherein the potential of the negative electrode at the time of the full charge is 0.35 V or more with respect to the metal lithium potential.

12. The energy storage device according to claim 5, wherein a height of the peak is 300 mAh/g·V or more.

13. An energy storage apparatus comprising a plurality of the energy storage devices according to claim 5, wherein
the plurality of energy storage devices are connected in series, and
the energy storage devices comprises a positive electrode including a lithium-transition metal composite oxide that has an α-NaFeO$_2$ type structure and is represented by a chemical composition of Li$_{1+x}$M$_{1-x}$O$_2$ (M is a transition metal and 0<x<0.3) as an active material.

14. The energy storage device according to claim 5, wherein the negative active material layer is formed on the metal foil.

15. The energy storage device according to claim 5, wherein the negative active material layer is superimposed on both surfaces of the metal foil.

16. The energy storage device according to claim 5, wherein the metal foil has a strip shape.

17. The energy storage device according to claim 5, wherein the metal foil comprises an aluminum foil or an aluminum alloy foil, the aluminum alloy comprising aluminum at 90% by mass or more.

18. The energy storage device according to claim 5, further comprising a conductive layer formed on to surface of the metal foil including the aluminum.

19. A method of an energy storage device comprising:
   forming a negative electrode including a negative active material layer comprising amorphous carbon as an active material;
   forming a positive electrode, the negative electrode and the positive electrode are wound in a state of being insulated by a separator, wherein,
   a curve obtained by determining a rate of change (dQ/dV) in a potential (V) of the amorphous carbon in a discharge capacity (Q) of the amorphous carbon per unit quantity based on a result obtained by measuring the potential (V) with respect to the discharge capacity (Q) and representing the rate of change (dQ/dV) with respect to the potential (V) has one or more peaks in a range in which the potential of the amorphous carbon is 0.8 V or more and 1.5 V or less, and
   a potential of the negative electrode at time of full charge is 0.25 V or more with respect to a lithium potential,
   wherein the negative electrode is formed by a metal foil including aluminum.

20. The method according to claim 19, wherein the potential of the negative electrode at the time of the full charge is 0.35 V or more with respect to the lithium potential.

\* \* \* \* \*